J. T. BISHOP.
BRAKE MECHANISM.
APPLICATION FILED FEB. 27, 1911.
1,025,115.
Patented May 7, 1912.
2 SHEETS—SHEET 1.
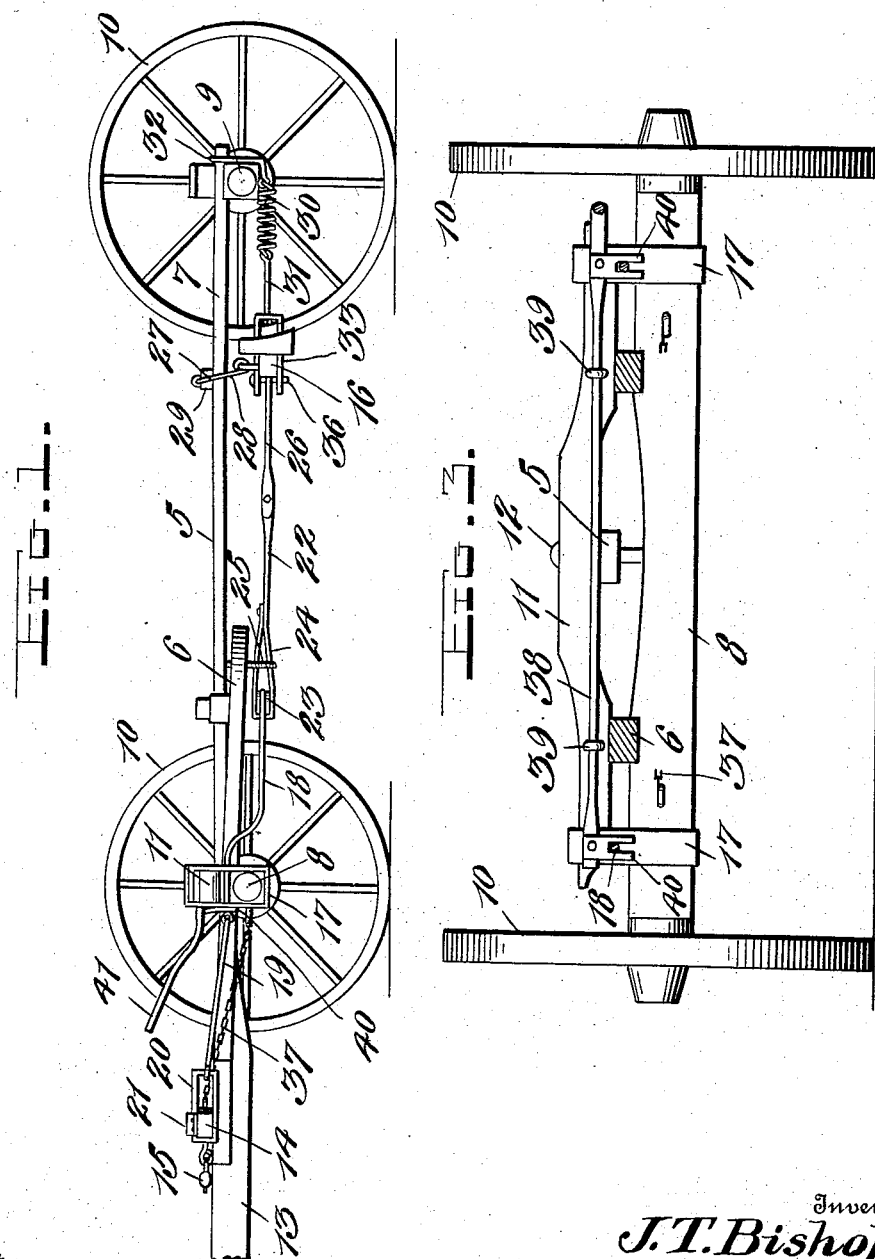
Witnesses
Chas. L. Griesbauer
L. S. Ellis.
Inventor
J. T. Bishop,
By Watson E. Coleman.
Attorney

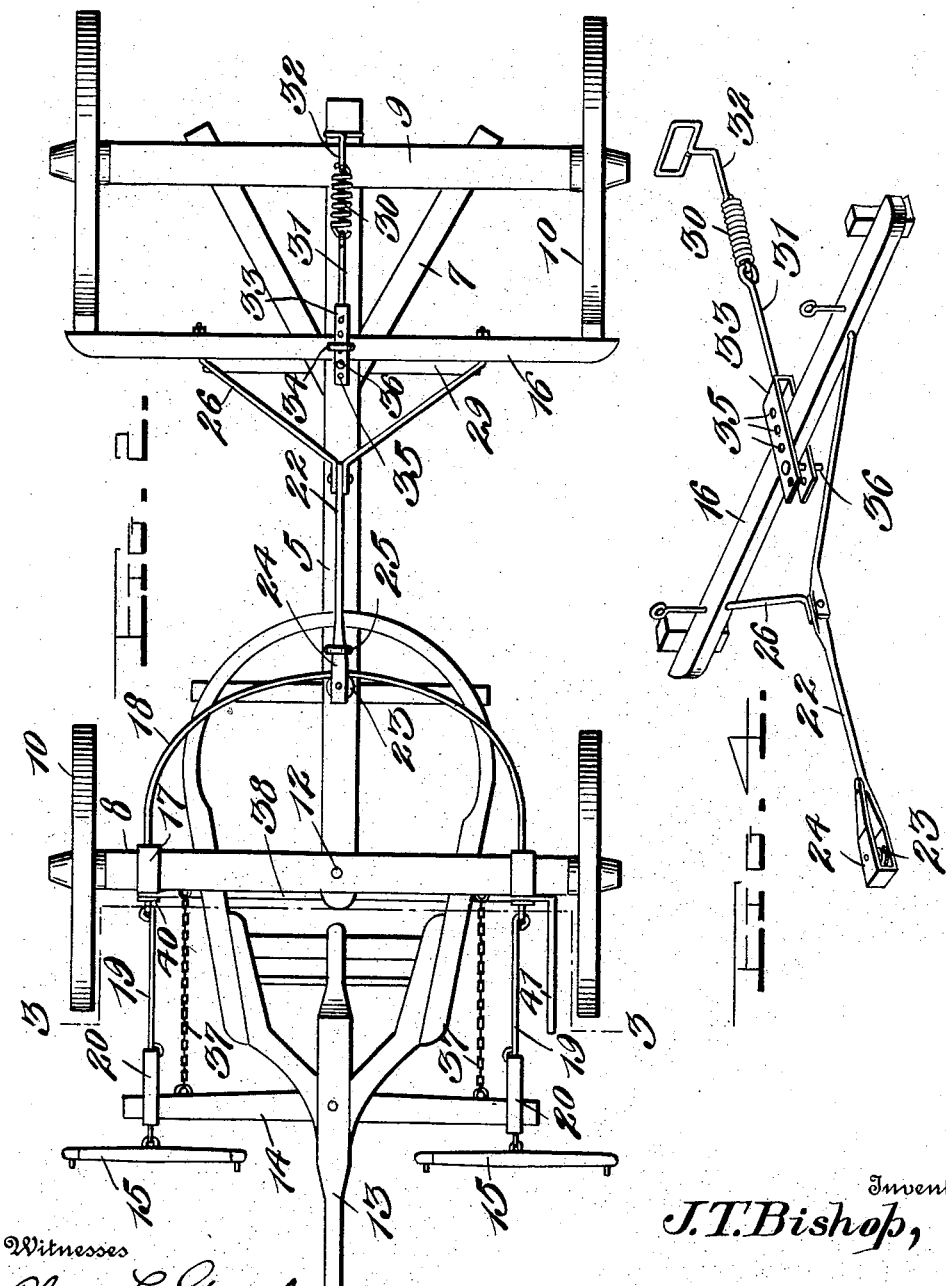

UNITED STATES PATENT OFFICE.

JAMES T. BISHOP, OF SALTILLO, MISSISSIPPI.

BRAKE MECHANISM.

1,025,115.　　　　Specification of Letters Patent.　　Patented May 7, 1912.

Application filed February 27, 1911. Serial No. 611,010.

*To all whom it may concern:*

Be it known that I, JAMES T. BISHOP, a citizen of the United States, residing at Saltillo, in the county of Lee and State of Mississippi, have invented certain new and useful Improvements in Brake Mechanism, of which the following is a specification, reference being had to the accompanying drawings.

This invention relates to wagon brakes and has for its object to provide a brake which is entirely automatic in its operation and which is normally maintained in an inoperative position by the draft animals.

A further object of the invention is to provide a movably mounted brake beam, connections between the beam and the swingletrees whereby said beam is held out of engagement with the wheels by the pull of the draft animals, and means for frictionally engaging the beam with the vehicle wheels when the vehicle is descending an incline, and the pull of the animals is discontinued.

A still further object of my invention resides in the provision of a brake mechanism which is comparatively simple in construction, highly durable and efficient in practical use and which may be easily mounted upon the running gear of the vehicle.

With the above and other objects in view, the invention consists of the novel features of construction, combination and arrangement of parts hereinafter fully described and claimed, and illustrated in the accompanying drawings, in which—

Figure 1 is a side elevation of a vehicle provided with my improved brake mechanism, the supporting wheels on one side being removed; Fig. 2 is a bottom plan view; Fig. 3 is a section taken on the line 3—3 of Fig. 2; and Fig. 4 is a detail perspective view of the brake beam and parts connected thereto.

Referring in detail to the drawings, 5 designates the reach bar and 6 and 7 the front and rear hounds respectively of the running gear. The hounds are mounted upon the axles 8 and 9 which are supported at each end by means of the wheels 10. The reach bar is mounted upon the front axle 8 between the same and the sand board 11 in the usual manner, by means of the king bolt 12. The tongue 13 is pivotally mounted for vertical movement between the ends of the front hounds 6 and upon the tongue the usual draft attachments consisting of the doubletree 14 and the swingletrees 15 are arranged.

The brake bar 16 is transversely disposed beneath the reach bar 5 and at its ends is adapted to engage with the periphery of the rear wheels 10. Suitable brake blocks or shoes may of course be arranged in the ends of this brake beam if desired. The swingletrees 15 are connected to this brake beam by means of a plurality of elements, the arrangement and operation of which will now be set forth in detail.

Clip plates 17 extend around the ends of the sand board 11 and the front axle 8. Through these clip plates the longitudinally extending ends of a U-shaped rod 18 are movably disposed. The extremities of this rod are formed with eyes to which the link rods 19 are connected. The other ends of these link rods are connected to the loops 20 which are movably disposed in the guide members 21 arranged upon the ends of the doubletree 14. To the forward ends of these loops the swingletrees 15 are loosely connected. The intermediate portion of the U-shaped rod 18 is curved and is movably disposed upon a pulley 23 mounted in a loop 24 formed upon one end of the longitudinally disposed rod 22. This rod extends through a guide eye 25 which is secured to the reach bar 5. To the other end of the rod 22 the inner ends of the diagonal rods 26 are connected, said rods being rigidly fixed at their other ends to the brake beam 16. This brake beam is loosely connected to the cranks 28 formed upon the ends of a rock shaft 27 which is mounted in suitable bearings arranged upon a transverse supporting bar 29 arranged upon the rear hounds 7. The ends of the beam 16 or the brake shoes carried thereby are normally held yieldingly upon the peripheries of the rear wheels 10 through the medium of a spring 30 which connects the opposed ends of the rods 31 and 32. The rod 32 is rigidly secured at its other end to the rear end of the reach bar and to the forward end of the rod 31 a yoke 33 is secured. The parallel arms of this yoke are disposed above and below the brake beam, the lower arm of said yoke extending through an eye 34 secured to the beam. The ends of the yoke are further provided with a plurality of openings 35 to receive a pin 36. By adjusting this pin in said openings, the tension of the spring 30 may be easily regulated to increase or decrease the pressure of the brake shoes upon the supporting wheels.

The manner in which the brakes are automatically applied is as follows:—When the vehicle is upon a level grade, the pull of the horses or other draft animals is transmitted from the swingletrees to which they are directly connected, by means of the elements previously described and the brake beam 16 whereby said beam is normally disposed forwardly away from the peripheries of the rear vehicle wheels 10. Upon descending a hill or other decline, however, the pull of the draft animals being no longer exerted, permits the spring 30 to contract thereby moving the brake beam and parts connected thereto rearwardly and firmly engaging the brake shoes with the peripheries of the wheels. As before stated, the expansion of the spring and consequently the pressure of the brake shoes on the wheels is regulated by the disposition of the pin 36 in the yoke 33.

Chains 37 are connected to the ends of the doubletree 14 and to the front axle bar 8 to prevent the pivotal movement of said doubletree at its point of connection to the tongue of the vehicle.

My improved brake mechanism is also adapted to be manually operated to apply the brakes when necessary, as when backing the vehicle to the curb. For this purpose a shaft 38 is mounted in bearings 39 arranged upon the sand board 11, and to said shaft at each end thereof a downwardly extending bifurcated arm 40 is secured. These bifurcated arms are disposed upon the forward ends of the U-shaped rod 18 adjacent to the eyes thereof. One end of the shaft 38 is formed with a crank handle 41 whereby said shaft may be rotated in its bearings to move the bifurcated arms upwardly and outwardly, thereby drawing the U-shaped rod 18 forwardly and thus disengaging the brakes from the rear supporting wheels 10.

From the foregoing description taken in connection with the accompanying drawings, it is thought that the construction and operation of my improved brake mechanism will be fully understood.

The device comprises comparatively few elements which may be easily and quickly arranged upon the running gear of vehicles of the common construction, without necessitating any change therein and at but slight expense. The driver is relieved of considerable labor and can give his whole attention to the driving of the team, the brakes being automatically applied immediately upon the vehicle moving upon a decline of the road surface.

The device is also extremely durable and highly efficient in practical use.

While I have shown and described the preferred construction and arrangement of the various parts, it will be understood that the invention is susceptible of considerable modification without departing from the essential features or sacrificing any of the advantages thereof.

Having thus described the invention what is claimed is:—

The combination with a vehicle running gear and supporting wheels, of a brake beam longitudinally movable on the running gear, means normally holding the beam in yielding engagement with the rear wheels, a U-shaped rod longitudinally movable on the running gear, the parallel ends thereof extending forwardly, means connecting said rod and the brake beam, guides for the ends of said rod, draft connections, link rods connecting the ends of the U-shaped rod with said connections, a transverse shaft rotatably mounted above the ends of said U-shaped rod and having an operating handle formed on one of its ends, said brake beam being normally held out of braking engagement with the vehicle wheels by the pull of the draft animals, and depending bifurcated plates fixed to said transverse shaft and engaging the forwardly extending ends of the U-shaped rod whereby said rod may be manually moved to release the brake beam from engagement with the wheels.

In testimony whereof I hereunto affix my signature in the presence of two witnesses.

JAMES T. BISHOP.

Witnesses:
J. W. RILEY,
R. D. PORTER.

---

Copies of this patent may be obtained for five cents each, by addressing the "Commissioner of Patents, Washington, D. C."